Oct. 16, 1951 W. L. STACE Re. 23,419

CHUCK

Original Filed Jan. 11, 1946 2 Sheets-Sheet 1

INVENTOR.
Walter L. Stace
BY
Hood & Hahn
ATTORNEYS.

Oct. 16, 1951 W. L. STACE Re. 23,419

CHUCK

Original Filed Jan. 11, 1946 2 Sheets-Sheet 2

INVENTOR.
Walter L. Stace
BY Hood & Hahn
ATTORNEYS

Reissued Oct. 16, 1951

Re. 23,419

UNITED STATES PATENT OFFICE 23,419

CHUCK

Walter L. Stace, Indianapolis, Ind.

Original No. 2,442,668, dated June 1, 1948, Serial No. 640,420, January 11, 1946. Application for reissue April 11, 1951, Serial No. 220,399

5 Claims. (Cl. 279—118)

Matter enclosed in heavy brackets [ ] appears in the original patent but forms no part of this reissue specification; matter printed in italics indicates the additions made by reissue.

The present invention relates to chucks, and the primary object of the invention is to provide a work-holding chuck of improved characteristics. More specifically it is an object of the invention to provide a chuck whose radially-grouped gripping fingers are formed by axially slotting a hollowed block of inherently resilient material, to a point near the base of said block, so that the gripping fingers, while radially shiftable toward and away from the block axis at and near their free ends, are nevertheless integral with the base and with each other, the above-mentioned shifting being made possible because of the inherent flexibility of the material of which the block is formed. While it is by no means the only available material having suitable characteristics, I presently prefer to form the said block of steel.

A further object of the invention is to provide, in a work-holding chuck, means for positively shifting the gripping fingers either toward the chuck axis or away from the same. Further it is an object of the invention so to arrange such means that all of the fingers will be simultaneously moved in the same direction and to substantially the same degree.

Another object of the invention is to provide operating means for the chuck in which the only exposed element of the operating mechanism is one which is rotatable, but not axially shiftable, relative to the gripping means, and in which that element houses or encloses the remaining elements of the operating mechanism.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
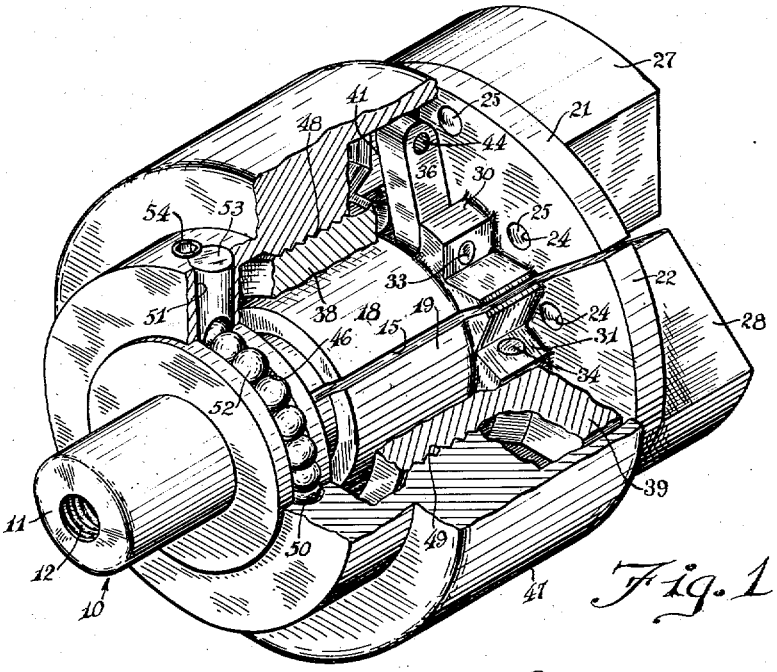
Fig. 1 is a perspective view of a chuck embodying my invention, parts being broken away for clarity of illustration.
Figure 2:
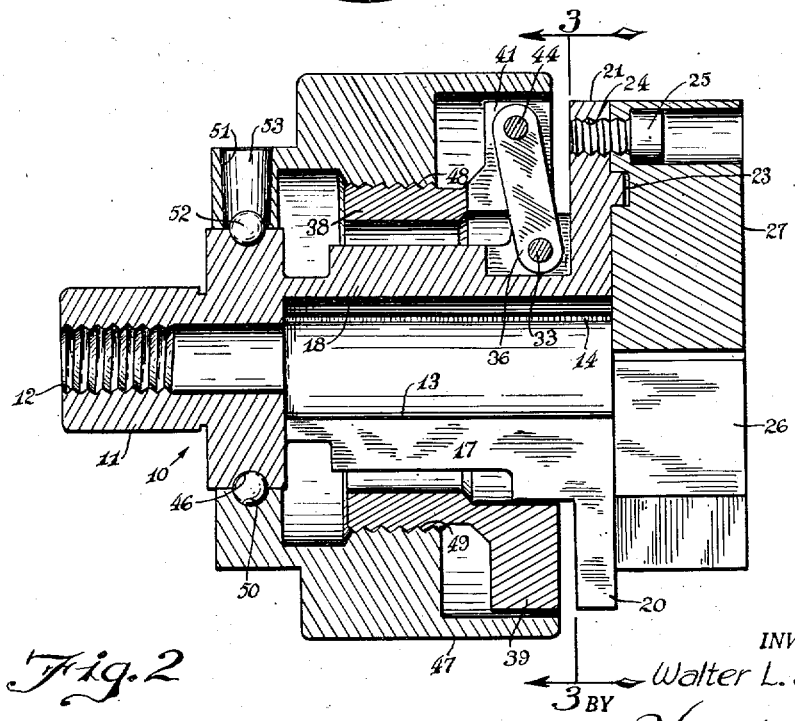
Fig. 2 is a longitudinal section of said chuck.

Referring more particularly to Figs. 1 and 2, it will be seen that I have illustrated a block indicated generally by the reference numeral 10, and comprising a base portion 11 which is bored and preferably internally threaded at 12 for mounting on a lathe spindle; and a body portion internally bored or hollowed at 13. The body portion is axially slotted at a plurality of peripherally spaced points, such as 14, 15, and 16, from the end of said body portion remote from said base to the root of the bore 13, thereby defining a similar number of resilient fingers 17, 18, and 19 grouped about the axis of said bore and flexibly movable toward and away from said axis.

The block 10 is originally formed at its end remote from its base 11, with a radially projecting peripheral flange, so that the formation of the above-mentioned slots leaves each finger provided, at its free end, with a radially projecting flange, said flanges being indicated by the reference numerals 20, 21, and 22. Each flange is formed with a bar 23 projecting from its forward face, and with a plurality of tapped holes 24 for the reception of screws 25 through the medium of which a segmental block 26, 27, or 28 may be removably secured to the forward face of each of the finger flanges.

Figure 3:
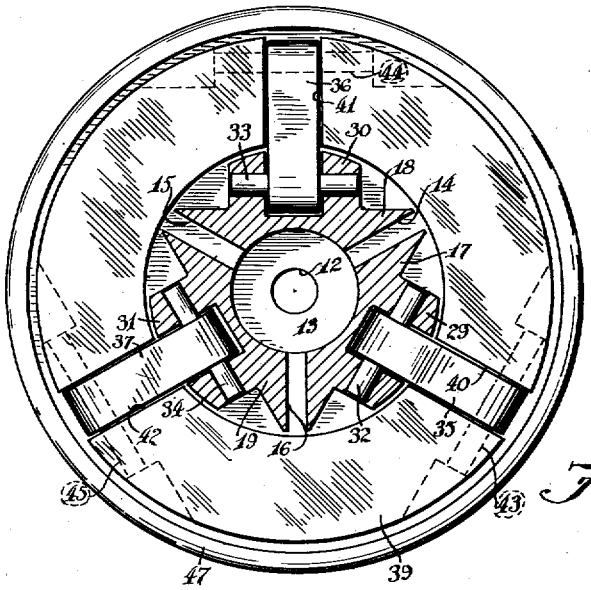
Fig. 3 is a transverse section, taken substantially on the line 3—3 of Fig. 2 and looking in the direction of the arrows.
Figure 4:
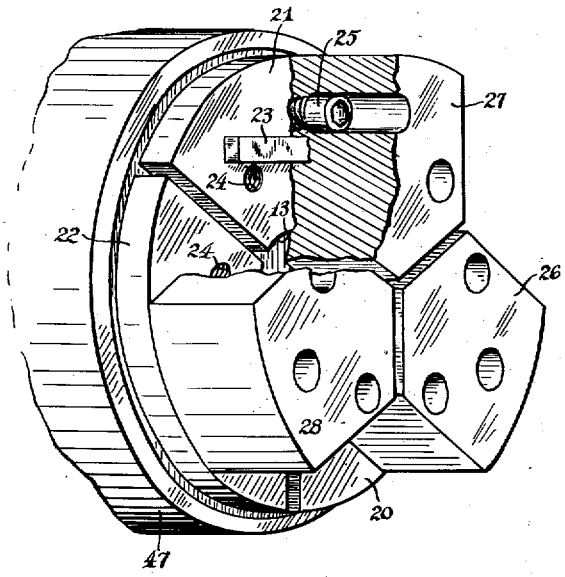
Fig. 4 is a fragmental perspective, taken from the opposite end of the chuck, parts being broken away to show the construction.

Each finger is formed, near its free end, with a pair of radially projecting ears. Thus, as seen in Fig. 3, the finger 17 carries the ears 29, the finger 18 has the ears 30, and the finger 19 is provided with ears 31. A pivot pin 32 traverses the space between the ears 29 and forms a pivotal mounting for one end of a link 35. Similarly, one end of a link 36 is pivotally mounted upon a pin 33 supported in the ears 30, and one end of a link 37 is pivotally mounted on a pin 34 supported in the ears 31.

A ring 38 comprising an actuator element for the fingers 17, 18, and 19, is formed with a radially projecting flange 39 providing radially extending slots 40, 41, and 42 so registering with the block 10 as to receive the opposite ends of the links 35, 36, and 37; and pivot pins are mounted to traverse said slots, respectively. Thus a pin 43 forms a pivotal mounting upon the element 38 for the opposite end of the link 35, the opposite end of the link 36 is pivotally connected to the element 38 through a pin 44, and the opposite end of the link 37 is pivotally secured by the pin 45 to the element 38.

The ring 38, of course, surrounds the fingers 17, 18, and 19 and is held by the links 35, 36, and 37, against rotation relative to said fingers. Said ring, however, is movable axially relative to said fingers, and it will be obvious that, because of connection provided by said links, movement of the ring 38 toward the right as viewed in Fig. 2 will force the free ends of the fingers radially toward the axis of the block, while movement of the ring 38 to the left as viewed in Fig. 2 will positively move the free ends of the fingers radially away from said axis. It will also be clear that the disclosed actuator means will cause all of the finger ends to be moved simultaneously in the same direction and substantially to the same degree.

The means for controlling the position of the ring 38, and therefore the positions of the finger ends, prossesses numerous advantages. The base 11 of the block 10 is formed with a bearing race 46 opening outwardly, as clearly shown in Figs. 1 and 2. A housing element 47 is mounted to surround and enclose the entire actuating mechanism. The ring 38 is externally threaded as at 48, and the housing element 47 is internally threaded, as at 49, for threaded engagement with the element 38. The element 47 is formed, at its rearward end, with an inwardly opening bearing race 50 adapted to register with the race 46. Said element 47, being first threadedly engaged upon the ring 38, is manually shifted into a position in which the race 50 registers accurately with the race 46. Said element 47 is formed with a radial bore 51 penetrating said element and opening into its race 50. With the races in registry, bearing members 52 are poured through said bore, and can be worked around through the registering races until the races are completely filled. Now, a plug 53 will be entered in said bore 51 to close the same, the inner end of said plug preferably being channeled to correspond to the shape of the race 50. Said plug 53 may be formed with a longitudinally extending extending external groove for registry with a short tapped socket formed in the element 47 and intersecting the bore 51. Obviously said groove and socket are formed simultaneously by drilling and tapping with the plug in its seat. Said socket is adapted to receive a screw 54 which, when seated, will hold the plug 53 in place and against rotation about its axis.

The blocks 26, 27 and 28 are formed of relatively soft steel, and it is intended that, after the blocks have been seated upon the flanges 20, 21 and 22 and firmly secured in place by the screws 25, the blocks will be machined to accommodate properly the work piece which is to be held in the chuck.

If it is desired to chuck a piece on its outside diameter, the element 47 will be moved substantially to its medial position, and thereupon the adjacent noses of the three blocks will be bored substantially to the diameter of the piece to be chucked. Similarly, if a piece is to be chucked on its inside diameter, the outside surfaces of the blocks will be turned down to the desired diameter, still with the element 47 in its medial position.

Obviously, if it later becomes desirable to chuck a piece with a larger outside diameter or with a smaller inside diameter, the inner or outer surfaces of the blocks may be re-machined for that purpose.

Of course, the user of the chuck will maintain a supply of blocks for substitution in case it should become necessary for him to use a smaller outside diameter or a larger inside diameter.

I claim as my invention:

1. A chuck comprising means providing a plurality of radially arranged and radially movable fingers, a link for each of said fingers having one end pivotally associated with its finger, actuator means mounted for movement relative to said fingers in line with the axis about which said fingers are arranged, the opposite end of said each links being pivotally associated with said actuator means, and a housing element arranged to enclose said actuator means, said housing element being held against axial movement relative to said fingers and having threaded engagement with said actuator means, whereby rotary movement of said housing element relative to said fingers produces axial movement of said actuator means relative to said fingers to move said fingers positively radially in either direction.

2. A chuck comprising means providing a plurality of radially arranged and radially movable fingers, a link for each of said fingers having one end pivotally associated with its finger, a ring surrounding said fingers and movable relative to said fingers in line with the axis about which said fingers are arranged, the opposite end of each of said links being pivotally associated with said ring, said ring being externally threaded, a housing element arranged to enclose said ring and internally threaded for threaded engagement with said ring, said housing element being rotatable relative to said fingers, but held against axial movement relative thereto.

3. In a chuck constructed in accordance with claim 1, a segmental block removably secured to the extremity of each of said fingers.

4. A chuck comprising means providing a plurality of fingers grouped about a common axis and movable radially toward and away from said axis, a link for each of said fingers having one end pivotally associated with its finger, actuator means surrounding said fingers and movable in line with said axis, the opposite end of each of said [fingers] *links* being pivotally associated with said actuator means, an element rotatable relative to said actuator means and operatively associated with said actuator means to produce axial movement of said actuator means in response to such relative movement, means fixed relative to said fingers and formed with an externally-opening bearing race, said last-named element being formed with an inwardly-opening bearing race registering with said externally-opening bearing race, and bearing members received in said registering races and holding said elements against axial movement relative to said fingers.

5. A chuck comprising means providing a plurality of fingers grouped about a common axis and movable radially toward and away from said axis, a link for each of said fingers having one end pivotally associated with its finger, actuator means surrounding said fingers and movable in line with said axis, the opposite end of each of said [fingers] *links* being pivotally associated with said actuator means, an element rotatable relative to said actuator means and operatively associated with said actuator means to produce axial movement of said actuator means in response to such relative movement, means fixed relative to said fingers and formed with an externally-opening bearing race, said last-named element being formed with an inwardly-opening bearing race registering with said externally-opening bearing race, a radial bore through said element opening into its race and adapted to lead bearing members from outside said element into said registering races to hold said element against axial movement relative to said fingers and a plug removably received in said bore to close the same.

WALTER L. STACE.

REFERENCES CITED

The following references are of record in the file of this patent or the original patent:

UNITED STATES PATENTS

| Number | Name | Date |
|---|---|---|
| 396,035 | Felt | Jan. 8, 1889 |
| 512,283 | Elliott | Jan. 9, 1894 |
| 725,346 | Krug | Apr. 14, 1903 |
| 968,051 | Hanson | Aug. 23, 1910 |
| 1,247,023 | Smith | Nov. 20, 1917 |